US011805261B1

(12) United States Patent
Girard et al.

(10) Patent No.: US 11,805,261 B1
(45) Date of Patent: *Oct. 31, 2023

(54) ADAPTIVE BIT RATE CONTROL FOR IMAGE COMPRESSION

(71) Applicant: Matrox Graphics Inc., Dorval (CA)

(72) Inventors: Mathieu Girard, Dorval (CA); Nicolas Jean, Dorval (CA); Alain Champenois, Dorval (CA); Jean-Jacques Ostiguy, Dorval (CA); Sergiu Bogdan Nicolescu, Dorval (CA)

(73) Assignee: Matrox Graphics Inc., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,695

(22) Filed: Sep. 18, 2020

Related U.S. Application Data

(63) Continuation of application No. 15/143,069, filed on Apr. 29, 2016, now Pat. No. 10,785,485.

(51) Int. Cl.
*H04N 19/146* (2014.01)
*H04N 19/124* (2014.01)
*H04N 19/177* (2014.01)
*H04N 19/196* (2014.01)

(52) U.S. Cl.
CPC ......... *H04N 19/146* (2014.11); *H04N 19/124* (2014.11); *H04N 19/177* (2014.11); *H04N 19/196* (2014.11)

(58) Field of Classification Search
None
See application file for complete search history.

(56) References Cited

U.S. PATENT DOCUMENTS

| 5,929,914 | A | 7/1999 | Normand |
| 6,741,747 | B1 * | 5/2004 | Burns ................ H04N 19/15 375/E7.139 |
| 6,834,080 | B1 * | 12/2004 | Furukawa ............ H04N 19/179 375/E7.145 |
| 6,912,255 | B2 | 6/2005 | Drezner et al. |
| 8,189,668 | B2 | 5/2012 | Hong et al. |

(Continued)

OTHER PUBLICATIONS

Aboalmaal Y M. F., et al., "Data-Level Parallel Approaches for the H.264 Coding: A Review," First International Engineering Conference (IEC2014), Nov. 2014, pp. 221-228.

(Continued)

*Primary Examiner* — Mohammed Jebari
(74) *Attorney, Agent, or Firm* — Build IP, LLC; Robert V. Donahoe

(57) ABSTRACT

A method and apparatus for enabling compression of a stream of pictures according to a target bit rate are described. A first configuration parameter for a first portion is determined based at least in part on a first relative weight of the first portion with respect to a first set of N portions, where the first set of N portions includes the first portion and N-1 portions which succeed the first portion. A second configuration parameter for a second portion of a second picture is determined based at least in part on a second relative weight of the second portion with respect to a second set of M portions of pictures, where the second set of M portions includes a subset of the N-1 portions from the first set and zero or more additional portions of pictures from the stream of pictures.

15 Claims, 9 Drawing Sheets

(56) References Cited

U.S. PATENT DOCUMENTS

| | | | |
|---|---|---|---|
| 8,526,488 | B2 | 9/2013 | Zheludkov et al. |
| 8,635,357 | B2 | 1/2014 | Ebersviller |
| 8,780,973 | B2 | 7/2014 | Srinivasamurthy et al. |
| 9,047,669 | B1 | 6/2015 | Ostiguy et al. |
| 2003/0235220 | A1* | 12/2003 | Wu .................. H04N 19/00 375/E7.176 |
| 2005/0105815 | A1* | 5/2005 | Zhang .............. H04N 19/198 375/E7.181 |
| 2005/0175093 | A1* | 8/2005 | Haskell ............ H04N 19/124 375/240.03 |
| 2006/0233237 | A1* | 10/2006 | Lu .................... H04N 19/61 375/E7.181 |
| 2006/0274832 | A1 | 12/2006 | Ducloux et al. |
| 2007/0263720 | A1* | 11/2007 | He .................... H04N 19/152 375/240.03 |
| 2008/0063052 | A1* | 3/2008 | Lin .................... H04N 19/61 375/E7.176 |
| 2009/0086816 | A1 | 4/2009 | Leontaris et al. |
| 2012/0140816 | A1 | 6/2012 | Franche et al. |
| 2014/0153644 | A1 | 6/2014 | Dzik |

OTHER PUBLICATIONS

Advisory Action Office Action, U.S. Appl. No. 15/143,069, dated Aug. 15, 2019, 4 pages.

Bhattacharyya S., et al., "Burstiness Minimized Rate Control for High Resolution H.264 Video Conferencing," IEEE Abstract, Communications (NCC), 2014 Twentieth National Conference on Feb. 28, 2014-Mar. 2, 2014, IEEE, [retrieved on Aug. 4, 2015] Retrieved from the Internet: <http://ieeexplore.ieee.org/xpl/login.jsp?tp=&arnumber=6811332&url=http> 2 pages.

Bhattacharyya S., et al., "Burstiness Minimized Rate Control for High Resolution H.264 Video Conferencing," IEEE, 2014, 6 pages.

Final Office Action, U.S. Appl. No. 15/143,069, dated May 21, 2019, 15 pages.

Ghandi, et al., "A Lagrangian Optimized Rate Control Algorithm for the H.264/AVC Encoder", 2004 International conference on Image Processing, vol. 1, pp. 123-126, Oct. 2004.

Gu, Junli, et al., "Optimizing a Parallel Video Encoder with Message Passing and a Shared Memory Architecture," Tsinghua Science and Technology, vol. 16, No. 4, Aug. 2011 , pp. 393-398.

He, et al., "Linear Rate Control and Optimum Statistical Multiplexing for H.264 Video Broadcast", IEEE Transactions on Multimedia, vol. 10, No. 7, pp. 1237-1249, Nov. 2008.

Kwon, et al., "A Novel Two-Stage Rate Control Scheme for H.264", IEEE International Conference on Multimedia and Expo 2006, pp. 673-676, Jul. 2006.

Kwon, et al., "Rate Control for H.264 Video With Enhanced Rate and Distortion Models", IEEE Transactions on Circuits and Systems for Video Technology, vol. 17, No. 5, pp. 517-529, May 2007.

Li, et al., "Adaptive Rate Control for H-264", Journal of Visual Communication and Image Representation, vol. 17, pp. 376-406, 2006.

Ma, et al., "Rate-Distortion Analysis for H.264/AVC Video Coding and its Application to Rate Control", IEEE Transactions on Circuits and Systems for Video Technology, vol. 15, No. 12, pp. 1533-1544, Dec. 2005.

Meenderinck C., et al., "Parallel Scalability of Video Decoders," Journal of Signal Processing Systems, 2008, 22 pages.

Merritt, et al., "Improved Rate Control and Motion Estimation for H.264 Encoder", IEEE International Conference on Image Processing 2007, vol. 5, pp. V309-V312, Oct. 2007.

Milani, et al., "A Rate Control Algorithm for the H.264 Encoder", Dept. of Information Engineering, University of Padova, Italy, 6 pages.

Non-Final Office Action, U.S. Appl. No. 15/143,069, dated Oct. 17, 2019, 16 pages.

Non-Final Office Action, U.S. Appl. No. 15/143,069, dated Nov. 8, 2018, 13 pages.

Notice of Allowance, U.S. Appl. No. 15/143,069, dated May 1, 2020, 9 pages.

Reibman, et al., "Constraints on Variable Bit-Rate Video for ATM Networks", IEEE Transactions on Circuits and Systems for Video Technology, vol. 2, No. 4, pp. 361-372, Dec. 1992.

Richardson, "H.264 and MPEG-4 Video Compressions: Video Coding for Next-generation Multimedia", Chapter 6, "H.264/MPEG-4 Part10", pp. 159-223, 2003.

Sharma H., "Comparative Performance of JM and FFMPEG Codecs of H.264 AVC Video Compression Standard," A Thesis Presented to the Faculty of San Diego State University, 2012, 73 pages.

Wang Y., et al., "Multi-Grain Parallel Accelerate System for H.264 Encoder on Ultrasparc T2," Journal of Computers, Dec. 2013, vol. 8 (12), pp. 3293-3297.

Yi, et al., "Improved H.264 Rate Control by Enhanced MAD-Based Frame Complexity Prediction", Journal of Visual Communication and Image Representation (Special Issue on Emerging H.264/AVC Video Coding Standard), Elsevier Science, pp. 1-14, May 2005.

Yoo K., et al., "Pipelining Architecture Design of the H.264/AVC HP@L4.2 Codec for HD Applications," Picture Coding Symposium 2007, Nov. 7-9, 2007, 4 pages.

* cited by examiner

Determine a first configuration parameter for a first portion of a first picture based at least in part on a first relative weight of the first portion with respect to a first set of N portions of pictures from the stream of pictures, where the set of N portions of pictures includes the first portion and N-1 portions which succeed the first portion in a compression order
302

Determine a second configuration parameter for a second portion of a second picture based at least in part on a second relative weight of the second portion with respect to a second set of M portions of pictures, where the second portion immediately succeeds the first portion in the compression order and the second set of M portions includes at least a subset of the N-1 portions from the first set of N portions which succeed the first portion in the compression order and zero or more additional portions of pictures from the stream of pictures; and where the first and second configuration parameters are to be used for compressing the first and the second portions respectively in accordance with the target bit rate
304

Figure 3

ADAPTIVE BIT RATE CONTROL FOR IMAGE COMPRESSION

CROSS-REFERENCE TO RELATED APPLICATIONS

This application is a continuation of application Ser. No. 15/143,069, filed Apr. 29, 2016, which is hereby incorporated by reference.

TECHNICAL FIELD

Embodiments of the invention relate to the field of image data compression and decompression; and more specifically, to bit rate control in image compression.

BACKGROUND ART

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of media (DVDs, Blu-Ray disks, mobile devices, memory sticks, hard-drive, etc.) and may be transmitted through a variety of wired or wireless transmission media (also called a carrier) (e.g., electrical, optical, radio, acoustical or other form of propagated signals—such as carrier waves, infrared signals etc.).

Image compression and decompression are performed to reduce the consumption of expensive resources, such as storage space or transmission bandwidth. In general, a codec (encoder/decoder) includes an encoder used to convert the source image data into a compressed form occupying a reduced space prior to storage or transmission. The codec may also comprise a decoder which receives compressed data and converts it into a decompressed image or stream ready for display or for further processing. The codec may be implemented only in software executed on one or more general purpose processors, implemented only on dedicated hardware components, or a combination of software running on general purpose processors and dedicated hardware components. Compression efficiency of encoders is typically defined by the bit rate and the perceived image quality of the decompressed video stream. In many applications, it is desirable to have a constant bit rate, maximum bit rate, or substantially constant bit rate while maintaining a good quality image. This can be particularly challenging for real time encoders that encode image data that has a high variability in content from picture to picture and/or within the same picture or when encoding/decoding pictures with high resolutions, high frame rate, or when low latency is desired.

According to standard approaches, when operating in a "controlled bit rate" mode, a codec allocates for each GOP of a stream of pictures an associated number of bits. The allocated number of bits represents the number of bits the compressed GOP can have in order for the codec to achieve a target bit rate. Each GOP is comprised of a plurality of pictures. The plurality of pictures may be grouped into subsets of a GOP referred to as subGOPs. A subGOP may be a single picture or a series of B type pictures with some of the pictures they refer to. Similarly the codec distributes the GOP's allocated number of bits to its subGOPs and distributes each subGOP's allocated number of bits to the portions of picture comprised in the subGOP. A portion of a picture may comprise at least one macro block. The allocated number of bits will allow the codec to keep track of bits used to compress portions of the data stream relative to the number of bits allowed and achieve compression of the stream of pictures according to the target bit rate. The allocated number of bits further allow the codec to determine appropriate compression parameters for compressing the portions of the subGOP. The determination of the allocated number of bits is performed upon scheduling of the GOP of pictures at the compression device. Thus, when the configuration parameters are not accurate (e.g., encoded pictures of the GOP do not meet the target bit rate and/or the quality requirement), the configuration parameters may not be updated fast enough.

SUMMARY OF THE INVENTION

A method in a compression device of enabling compression of a stream of pictures according to a target bit rate is described. The method comprises determining a first configuration parameter for a first portion of a first picture based at least in part on a first relative weight of the first portion with respect to a first set of N portions of pictures from the stream of pictures, where the first set of N portions of pictures includes the first portion and N-1 portions which succeed the first portion in a compression order. The method continues with determining a second configuration parameter for a second portion of a second picture based at least in part on a second relative weight of the second portion with respect to a second set of M portions of pictures, where the second portion immediately succeeds the first portion in the compression order and the second set of M portions includes a subset of the N-1 portions from the first set of N portions which succeed the first portion in the compression order and zero or more additional portions of pictures from the stream of pictures; and where the first and second configuration parameters are to be used for compressing the first and the second portions respectively in accordance with the target bit rate.

A compression device for enabling compression of a stream of pictures according to a target bit rate is described. The compression device comprises a non-transitory computer readable storage medium to store instructions; and one or more processors coupled with the non-transitory computer readable storage medium to process the stored instructions to determine a first configuration parameter for a first portion of a first picture based at least in part on a first relative weight of the first portion with respect to a first set of N portions of pictures from the stream of pictures, where the first set of N portions of pictures includes the first portion and N-1 portions which succeed the first portion in a compression order, and determine a second configuration parameter for a second portion of a second picture based at least in part on a second relative weight of the second portion with respect to a second set of M portions of pictures, where the second portion immediately succeeds the first portion in the compression order and the second set of M portions includes a subset of the N-1 portions from the first set of N portions which succeed the first portion in the compression order and zero or more additional portions of pictures from the stream of pictures, where the first and second configuration parameters are to be used for compressing the first and the second portions respectively in accordance with the target bit rate.

BRIEF DESCRIPTION OF THE DRAWINGS

The invention may best be understood by referring to the following description and accompanying drawings that are used to illustrate embodiments of the invention. In the drawings:

FIG. 3 illustrates a flow diagram of exemplary operations performed in a codec for enabling a dynamic bit rate control of image data compression in accordance with some embodiments.

DETAILED DESCRIPTION

Figure 1:
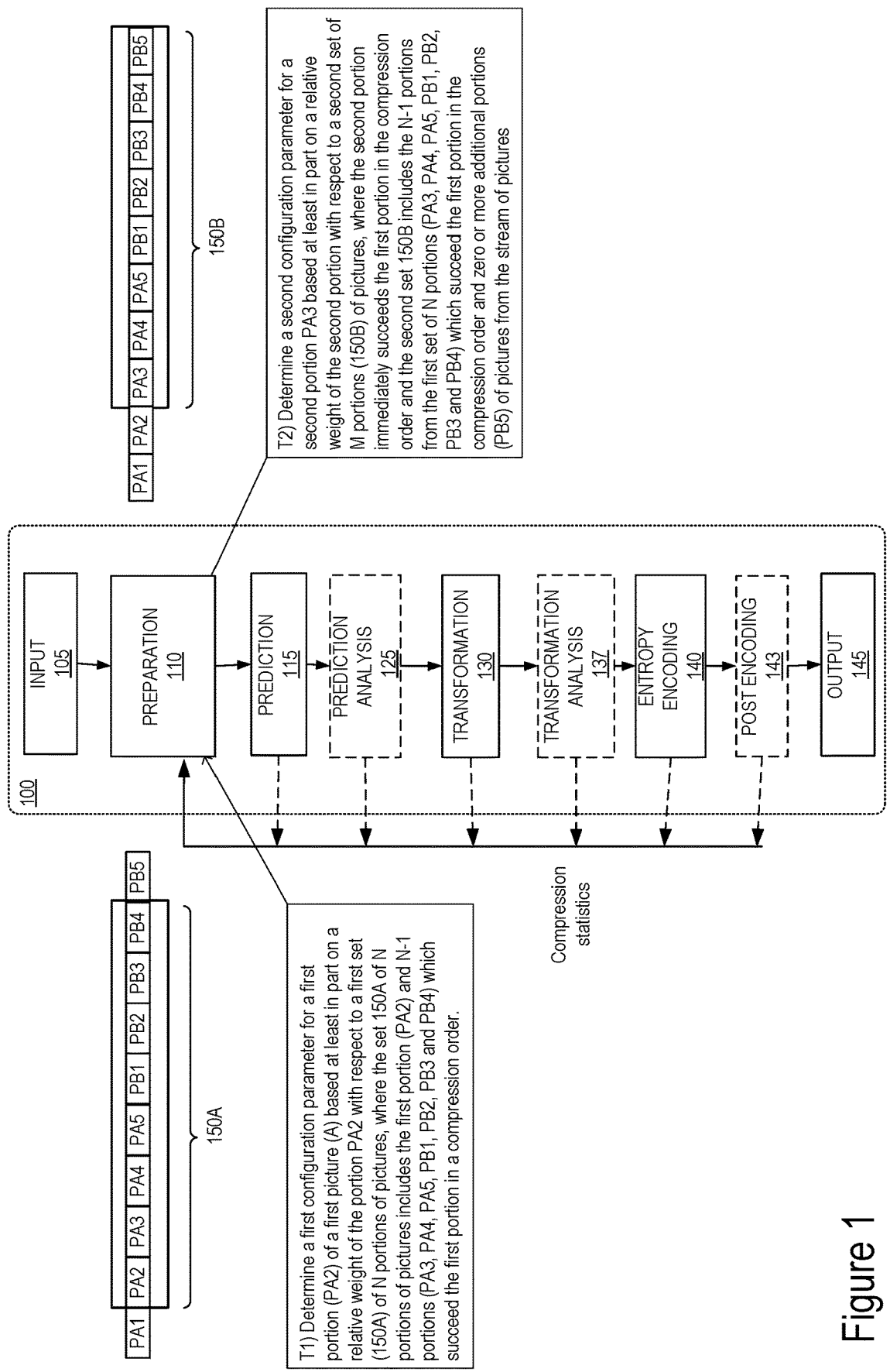
FIG. 1 illustrates an exemplary block diagram of a compression pipeline 100 enabling bit rate control of image data compression in accordance with some embodiments.

The following description describes methods and apparatus for compressing a stream of pictures in parallel in a compression device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments of the present invention describe a method and apparatus for enabling an adaptive bit rate control for image data compression. According to some embodiments, configuration parameters are determined for a given portion of a picture from a stream of pictures with respect to a dynamic set of other portions of pictures of the stream of pictures. These configuration parameters are used to process the given portion in accordance with compression criteria for the stream of pictures. The compression criteria can include a constant bit rate for the compressed stream, a maximum number of bits for the compressed stream, or a substantially constant bit rate while maintaining a good quality image. This is done to control the rate of compression of the stream of pictures and for providing a target bit rate (e.g., a maximum bit rate, a substantially constant, or constant bit rate).

In one embodiment, a configuration parameter is determined for a given portion of a first picture based at least in part on a relative weight of the portion with respect to a set of N portions of pictures from the stream of pictures. The set of N portions of pictures includes the given portion and N-1 portions which succeed the first portion in a compression order. A second configuration parameter is then determined for a portion of a second picture immediately succeeding the given portion. The second configuration parameter is based at least in part on the relative weight of the second portion with respect to another set of M portions of pictures. The second set of M portions includes the N-1 portions from the first set of N portions which succeed the first portion in the compression order and zero or more additional portions of pictures from the stream of pictures. The configuration parameters are determined such that compression of the given portion and the following portion, which follows the given portion in the compression order, is performed in accordance with a target bit rate. In some embodiments, each of the configuration parameters is determined based on an allocated number of bits (or bit budget) for each of the portions which satisfies the target bit rate.

The present invention presents an adaptive bit rate control, in which a budget of bits is distributed dynamically on a portion of pictures when the portion is evaluated with respect to portions of a dynamic set of portions. In some embodiments, the adaptive bit rate control takes into consideration recent compression statistics of the latest portions processed in the compression device into the determination of the configuration parameter. In one embodiment, the compression statistics may include partial compression statistics resulting from the processing of a picture in the compression device when the compression of the picture is not yet completed. The present invention presents clear advantages with respect to standard bit rate control mechanisms by providing a high level of adaptability such that corrections are quickly addressed and where flow of encoded bits can respect conditions to avoid overflows or underflows.

While the embodiments below will be described with respect to a codec (i.e., a device enabling compression and decompression of image data); other embodiments can be performed in a device which enables compression only (which may be referred to as an encoder or a compression device) without departing from the scope and spirit of the present invention.

FIG. 1 illustrates an exemplary block diagram of a compression pipeline 100 enabling bit rate control of image data compression in accordance with some embodiments. The compression pipeline represents multiple operations 105-145 performed in a codec (e.g., codec 800) for compressing image data. The compression pipeline 100 includes an input operation 105, a preparation operation 110, a prediction operation 115, a transformation operation 130, an entropy encoding operation 140, a post encoding operation 143, and an output operation 145 for processing image data. In some embodiments, the compression pipeline may further include a prediction analysis operation 125 and a transformation analysis operation 137. In alternative embodiments, the pipeline 100 does not include at least one of the prediction analysis 125 and the transformation analysis 137.

The image data may correspond to a stream of pictures, a picture, and/or a portion of a picture. A picture may refer to a frame when the scan mode of the stream of pictures is progressive. Alternatively a picture may refer to a field when the scan mode of the stream of pictures is interlaced. In some embodiments, a portion of a picture may correspond to one or more macroblocks. For example, a portion of a picture may be a slice or a plurality of slices. In some embodiments, a portion may represent a parallelized item such that each operation of the compression pipeline 100 is operative to process a portion of a picture at a given time T, while other operations of the pipeline are operative to process other portions of pictures at that same time T.

According to one embodiment, at the input operation 105 a request to compress image data is received. The preparation operation 110 is operative to determine configuration parameters for configuring each following operation of the pipeline for processing a current portion of a first picture. The determination of the configuration parameters for a current portion of a first picture is based at least in part on a relative weight of the portion with respect to a set of N portions of pictures from the stream of pictures. The set of N portions of pictures includes the current portion and N-1 portions which succeed the current portion in a compression order. In some embodiments, the relative weight of a portion may depend on compression statistics resulting from the processing of other portions in the compression pipeline. The more recent these statistics are in terms of picture timeline, the better the prediction for a new picture will be. In some embodiments, the compression statistics include partial compression statistics resulting from the partial processing of a picture in the pipeline. For example, the partial compression statistics result from the processing of other portions of the same picture (first picture) and/or portions of pictures which precede the first picture in the compression pipeline 100 while the compression of this picture is not yet complete. In some embodiments, the configuration parameters may also be determined based on compression statistics related to the processing of portions of other pictures which have completed their processing in addition to the partial compression statistics. The partial compression statistics may include information related to the processing of a portion when the portion has completed its processing (e.g., effective size of the encoded portion), or intermediary information related to the processing of the portion at other operations of the pipeline.

The prediction operation 115 is operative to determine a prediction mode for processing the portion of the picture. At the prediction operation 115, a portion of a picture and reference pictures are received and an intra prediction or an inter prediction mode for the compression of the portion of the picture is selected. If intra prediction is selected, information contained only within the current picture may be used for the prediction. If inter prediction is selected, information from a previously encoded picture may be used in the prediction. The selection of the prediction mode is made using a variety of factors, such that the difference between a prediction and the portion of the picture is minimized Prediction parameters are generated (e.g., partitioning of the portion of picture, motion vectors, and selected reference pictures) according to the selected prediction mode. The prediction parameters are then used in the following operation of the pipeline.

The prediction parameters, mode selection and reference pictures are used at the transformation operation 130 to generate the prediction, which is subtracted from the portion of the picture to generate a residual. The residual is then transformed and quantized according to a quantization parameter (QP, which is determined at least in part based on partial compression statistics) to obtain a set of quantized transform coefficients. The transformation applied may depend on the algorithm followed for the compression. For example, under H.264 standard, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macro blocks predicted in 16×16 mode. Under other standards, other transforms may be used, as appropriate. The quantized transform coefficients generated are scaled (Q-1) and inverse transformed to produce a difference portion. The prediction is added to the difference portion to form a reconstructed portion of the picture. The reconstructed portion is a decoded and unfiltered version of the original portion of the picture. The reconstruction portion may be passed directly to the in-loop filtering operation 135. In some embodiments, filtering is performed to reduce the effects of blocking distortion and the reconstructed reference picture is created from a series of blocks. In some embodiments, the in-loop filtering is skipped.

The reconstruction parameters and transform coefficients are then used by the entropy encoding operation 140. In accordance with some embodiments, at operation 140, entropy encoding can be performed on the transform coefficients using any known entropy encoding mappings. For example, this may be done by mapping a 2×2, 4×4, or 8×8 block of quantized transform coefficients to a 4, 16, or 64-element array, respectively. Elements may be encoded using either variable-length codes such as context-adaptive variable length codes (CAVLC) and Exp-Golomb codes, or using context-adaptive arithmetic coding (CABAC), depending on the entropy encoding mode, as per H.264. Other entropy encoding compression schemes may also be applicable. Similarly, the reconstruction parameters may be encoded using any known entropy encoding mappings. Finally the compressed portion of the picture is output at operation 145.

In one embodiment, compression statistics resulting from the compression of a picture are gathered at each one of the prediction analysis operation 125, the transformation analysis operation 137 and the post encoding operation 143. These compression statistics are then fed back to the preparation operation 110 for determining the configuration parameters for processing a portion of a picture. In other embodiments, compression statistics are gathered from at least one of the prediction analysis operation 125, the transformation analysis operation 137 and the post encoding operation 143. For example, in one embodiment, compression statistics related to the compression of a portion of a picture are gathered at the post encoding operation 143 only and transmitted to the preparation operation 110. In some embodiments, one or more of the operations 125, 137 and 143 can be skipped.

Upon receipt of a request for compression of image data from an application, the codec is configured according to the compression request and parameters to compress the image data. The parameters may be general parameters defining how the image data is to be compressed. For example, the parameters may comprise picture resolution and timings (e.g. pixel format, size, pixel depth, scan mode, frame rate), slice type and size, information relative to the sequence of pictures (e.g. picture hierarchy, Group Of Picture (GOP) structure (I period, P period, Idr period), GOP offset, a target bit rate, allowed drift from the target bit rate, the latency, coding functions and other information delimiting the operational mode of the codec for processing the stream of pictures (e.g. rate control mode, Minimum and maximum QP, QP correction tensors, QP offsets, scene detection threshold, PSNR offsets).

In some embodiments, the request received is for processing a stream of pictures and the request is broken down into multiple requests for processing portions of the picture. In other embodiments, the request received may be for processing a portion of a picture and the request is processed without being broken down. In some embodiments, at a given time T, the compression pipeline 100 is operative to process multiple portions of one or more pictures simultaneously. In some of these embodiments, the compression pipeline 100 is operative to process portions of a same picture in parallel, and wait for the completion of this picture prior to processing the following picture. In some embodiments, the compression pipeline 100 is operative to process portions of at least two different pictures in parallel. In some embodiments, the compression pipeline 100 may be operative to process portions of pictures sequentially such that each portion is processed once the processing of the preceding portion has been completed.

Figures 2A, 2B:
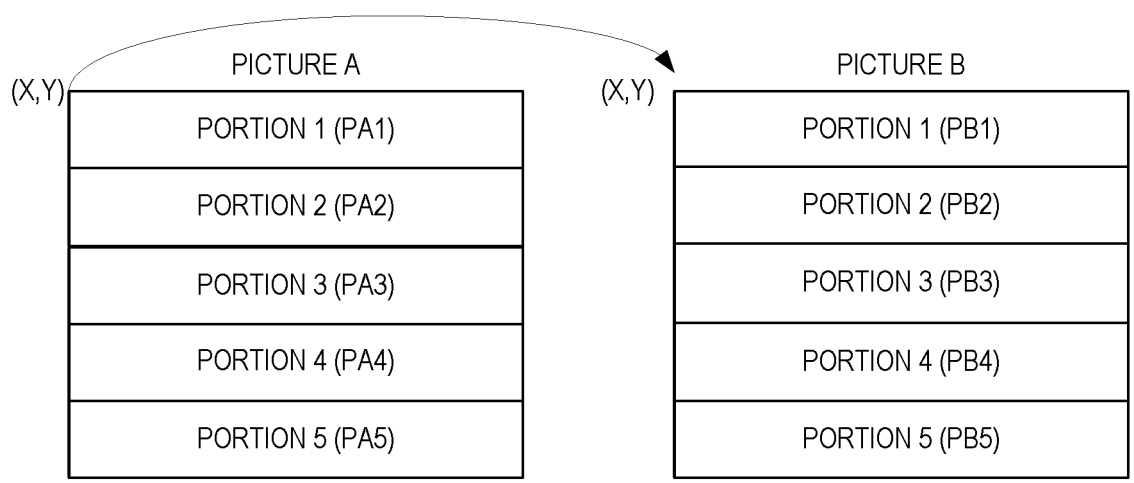
FIG. 2A illustrates a block diagram of an exemplary picture including a set of portions in accordance with some embodiments.
FIG. 2B illustrates a block diagram of an exemplary picture including a set of portions in accordance with some embodiments.

The operations performed in the compression pipeline of FIG. 1 will be described with reference to pictures A and B of FIGS. 2A-B respectively. However, it should be understood that these operations can be performed with respect to pictures of varying size and division, other than those discussed with reference to FIGS. 2A and 2B. FIGS. 2A and 2B illustrate block diagrams of exemplary pictures A and B, where each picture includes a set of portions in accordance with some embodiments. In the illustrated example, pictures A and B are divided into a same number of portions, where each portion has a corresponding portion in the other figure which is identical in size and position (e.g., portions PA1, PA2, PA3, PA4, and PA5 correspond to portions PB1, PB2, PB3, PB4, and PB5 respectively; each of these couples of portions (e.g., PA1 and PB1) are located at the same position (X, Y) within their respective pictures and have the same size (i.e., include the same number of macroblocks)).

In embodiments described herein, in order to provide compression of a stream of pictures according to a target bit rate, the codec determines compression parameters for processing a new portion from the stream when the portion is scheduled to be processed in the compression pipeline 100. Further, the configuration parameters are determined with respect to a weight of the portion relative to a set of portions. The set of portions is determined dynamically and is associated with the portion to be processed. In some embodiments, the configuration parameters include a quantization parameter and/or a set of coefficients representative of the quantization parameter for compression of the first portion. For example, the set of coefficients may be a plurality of quantization parameter offsets and biases which may vary according to the type and size of a portion. In one example, the configuration parameters may further include an inter-offset bias (which is used in the determination of the prediction mode at the prediction operation 115). In another example, the configuration parameter may include a decision to dynamically modify the structure of the GOP (GroupOfPicture) to be processed. The configuration parameters may further include an indication to skip compression of a portion (by generating a Pskip for the portion). The configuration parameters listed herein are exemplary only and other configuration parameters may be determined.

FIG. 1 illustrates an exemplary succession of portions PA1-PA5 from picture A and PB1-PB5 to be compressed in the compression pipeline 100. As illustrated in FIG. 1, picture B follows picture A in a compression order such that the first portion PB1 of picture B is processed after the last portion PA5 of picture A.

At time T1, the portion PA2 is scheduled to be processed at the preparation operation 110. At this operation, the codec determines one or more configuration parameters for processing portion PA2 of picture A based at least in part on a relative weight of the portion PA2 with respect to a first set (150A) of N portions of pictures. The set 150A of N (e.g., N=8) portions of pictures includes the first portion (PA2) and N-1 portions (PA3, PA4, PA5, PB1, PB2, PB3 and PB4) which succeed the first portion in a compression order.

At time T2, the portion PA3 is scheduled to be processed at the preparation operation 110. At this operation, the codec determines a second configuration parameter for processing portion PA3 based at least in part on the relative weight of this portion with respect to a second set of M portions of pictures (the set 150B). Portion PA3 immediately succeeds the first portion PA2 in the compression order and the second set 150B includes the N-1 portions from the first set 150A (i.e., portions PA3, PA4, PA5, PB1, PB2, PB3 and PB4) which succeed the first portion in the compression order and zero or more additional portions of pictures (e.g., portion PB5) from the stream of pictures. Thus, when the second portion PA3 is scheduled to be processed in the compression pipeline 100, configuration parameters for processing this portion are determined based on the set of portions 150B that includes non-processed portions of the stream of pictures, which is different from the set 150A used to determine the configuration parameters for processing the preceding portion PA2. The set of portions is dynamically updated each time a new portion is scheduled to be processed in the compression pipeline. While in the illustrated example, the set 150B includes the subset of N-1 remaining portions of the set 150A and an additional portion, in other embodiments, the set 150 may include only a subset of portions from the remaining N-1 portions, where the subset is strictly less than the N-1 portions. In other embodiments, the set of portions may include in addition to the N-1 portions more than one additional portion.

As will be described in further details below with respect to FIGS. 3-6, in order to determine configuration parameters for processing portions of a stream of pictures, which is to be compressed according to a target bit rate, a bit budget is distributed over the portions of a dynamic set of portions based on the relative weight of each portion with respect to all portions in the set. Thus, in the example presented in FIG. 1, when a number of bits is allocated from the bit budget to portion PA2, this number of bits is determined according to a relative weight of the portion PA2 when compared with the portions of the set 150A. Alternatively, when a number of bits is allocated from the bit budget to portion PA3, this number of bits is determined according to a relative weight of the portion PA3 when compared with the portions of the set 150B which does not include the previously scheduled portion PA2. While the illustrated embodiment provides an example in which a portion succeeding portion PA2 is from the same picture A, in other embodiments, a succeeding portion can be from another picture.

Thus contrary to standard approaches in which configuration parameters (e.g., quantization parameters, and other parameters) are determined based on a static allocation of bits over a set of pictures, the present embodiments present a more dynamic distribution of budget that is performed at the level of the scheduling of the portion. In other words an allocated number of bits (and consequently configuration parameters) is determined for a portion only when the portion is ready to be scheduled for processing at the compression pipeline ensuring that most recent compression statistics providing from the compression of other portions/pictures are available for the determination of these parameters. Further the determination of the allocated bits is performed according to a dynamic set of portions which is redefined at the moment of scheduling of a portion providing a high level of adaptability such that corrections to the quality and/or compression bit rate are quickly addressed.

FIGS. 3-6 illustrate flow diagrams of exemplary operations performed in a codec for enabling a dynamic bit rate control of image data compression in accordance with some embodiments. The operations of the flow diagrams are performed in a rate control unit of a preparation operation of a compression pipeline. In some embodiments, these operations are performed following the scheduling of a portion of a picture to be processed at the preparation operation 110. The operations in the flow diagrams will be described with reference to the exemplary embodiments of the other figures. However, it should be understood that the operations of the flow diagrams can be performed by embodiments of the invention other than those discussed with reference to these other figures, and the embodiments of the invention discussed with reference to the other figures can perform operations different than those discussed with reference to the flow diagrams.

At operation 302, the codec determines one or more configuration parameters for processing a first portion (e.g., PA2) of a first picture A based at least in part on a relative weight of the portion PA2 with respect to a first set (150A) of N portions of pictures. In some embodiments, the set of portions may include a plurality of portions from multiple pictures. For example, the set of portions may include 64 portions. Other numbers of pictures may be included in the set of portions without departing from the scope of the present invention. A picture may refer to a frame when the scan mode of the stream of pictures is progressive. Alternatively a picture may refer to a field when the scan mode of the stream of pictures is interlaced. In some embodiments, a portion of a picture may correspond to one or more macroblocks. For example, a portion of a picture may be a slice or a plurality of slices. Each picture from the sets of portions may include a varying number of portions. While some embodiments are described with respect to pictures A and B which are similar in size and in number of portions, these pictures are exemplary only and the embodiments are not so limited, and the set of portions may include pictures of varying sizes and number of portions.

At operation 304, the codec determines a second configuration parameter for processing portion PA3 based at least in part on the relative weight of this portion with respect to a second set of M portions of pictures (the set 150B). In some embodiments, the configuration parameters include a quantization parameter and/or a set of coefficients representative of the quantization parameter for compression of the first portion. Portion PA3 immediately succeeds the first portion PA2 in the compression order and the second set 150B includes the N-1 portions from the first set 150A (i.e., portions PA3, PA4, PA5, PB1, PB2, PB3 and PB4) which succeed the first portion in the compression order and zero or more additional portions of pictures (e.g., portion PB5) from the stream of pictures. While in this example, the portions PA1 to PA5 of picture A, and the portions PB1 to PB5 of picture B are illustrated to be compressed in a compression order which is identical to a display order, in other embodiments, the portions of a picture may be compressed in an order that is different from the display order of the portions. Similarly, in some embodiments, pictures of a stream can be processed in the compression pipeline 100 in an order that is different from the display order of the pictures. For example while in some embodiments picture B may succeed picture A in the display order, in other embodiments it may not be the case. In some embodiments, the second set of portions 150B may have a different number of portions than the first set of portions 150A. For example, the second set of portions may only include the N-1 portions from the first set of portions. This may be the case for example, when there are no remaining portions of the stream to process other than the N-1 portions of the first set. In another example, the set of portions may include a number M that is greater than the number N of portions of the first set.

Each of the configuration parameters determined for the first portion PA2 and for the second portion PA3 respectively enable compression of the portions in the codec in accordance with the target bit rate.

Figure 4:
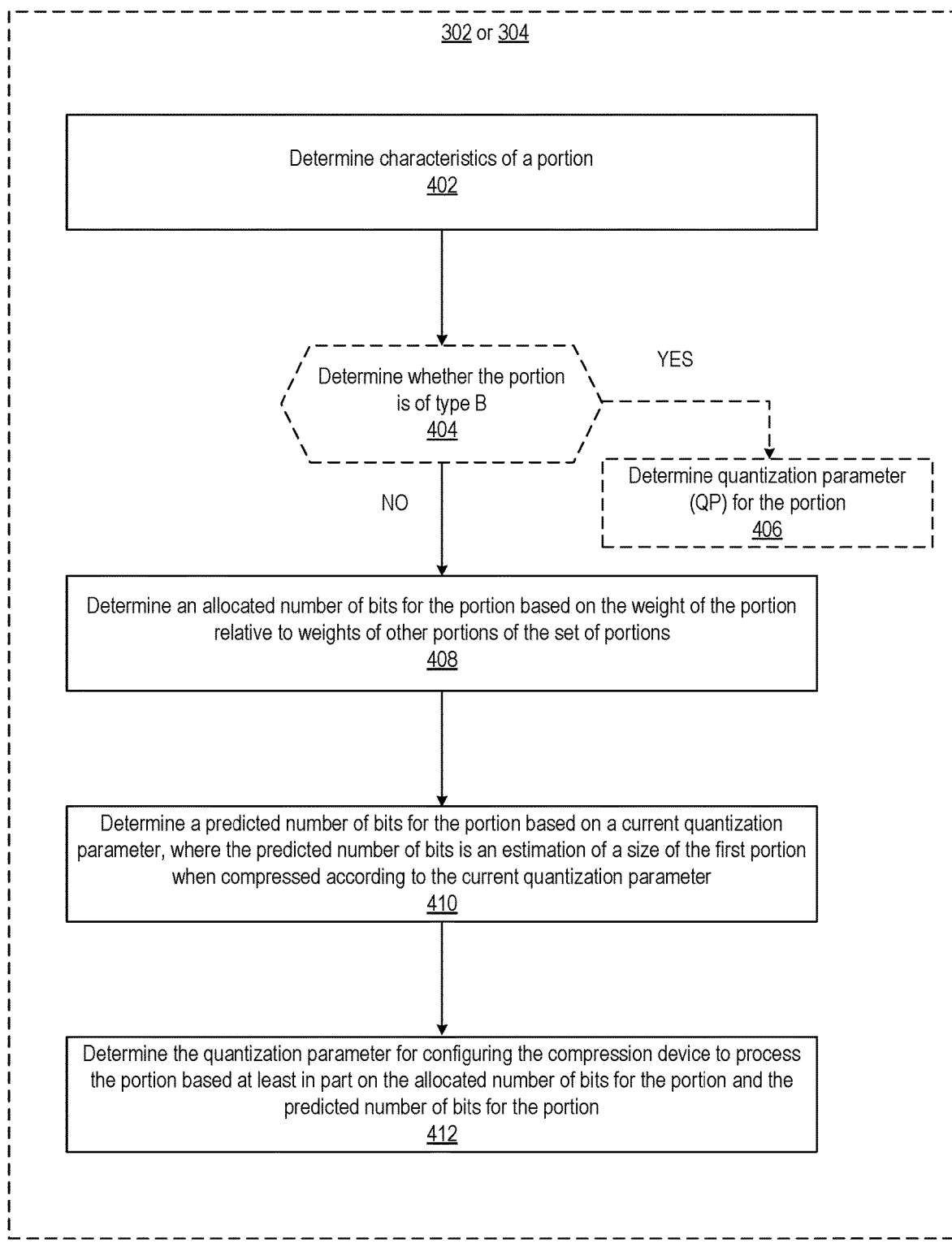
FIG. 4 illustrates a flow diagram of exemplary detailed operations performed for determining configuration parameter(s) of a portion in accordance with some embodiments.

FIG. 4 illustrates a flow diagram of exemplary detailed operations performed for determining configuration parameter(s) of a portion in accordance with some embodiments. While the flow diagrams of FIGS. 4-6 will be described with respect to determining configuration parameters for portion PA2 of picture A, the same operations apply for any portion scheduled to be processed at the compression pipeline. As will be described below, the operations of FIGS. 3-6 may be performed by a rate control as part of a preparation operation 110 in the compression pipeline 100. At operation 402, the codec determines characteristics of a portion to be processed. The characteristics include at least one of a type of portion (which may be I, B or P) and a position of the portion within the picture. In some embodiments, the characteristics may further include information regarding the color plane of the portion (i.e., Luma plane and Chroma planes) and/or a field type (which may be interlaced or progressive). In some embodiments, the field type may be indicated only when the stream of pictures is in an interlaced format.

Figure 5:
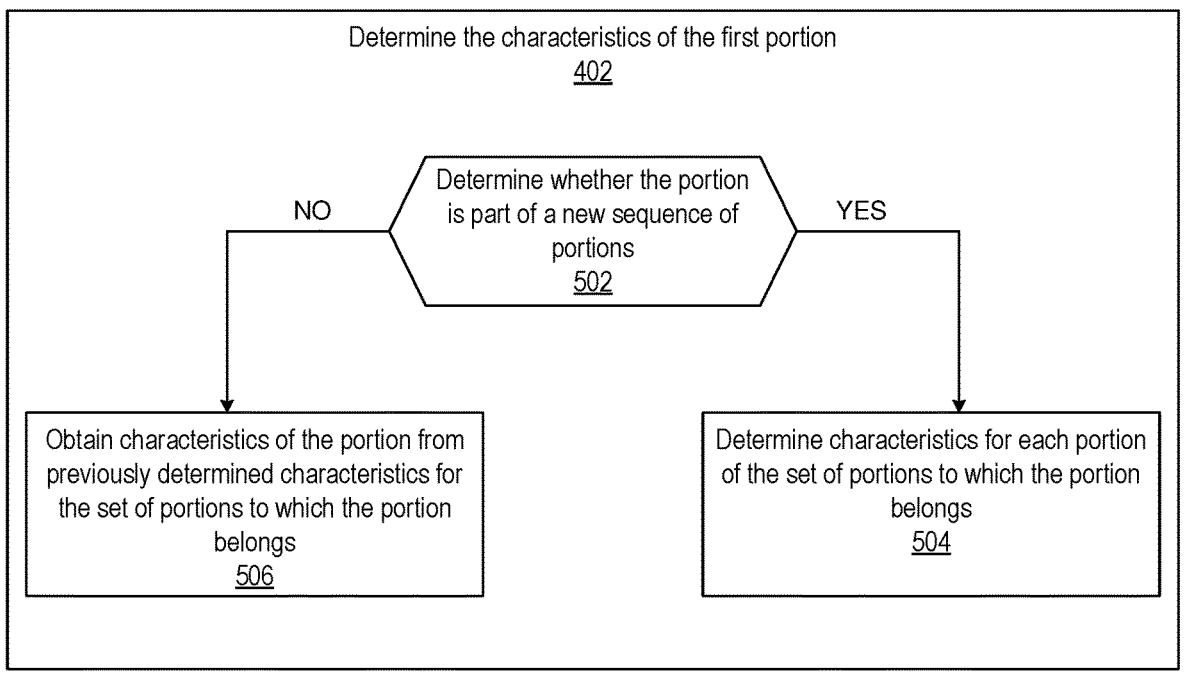
FIG. 5 illustrates a flow diagram of exemplary detailed operations for determining characteristics of a portion in accordance with some embodiments.

FIG. 5 illustrates a flow diagram of exemplary detailed operations for determining characteristics of a portion in accordance with some embodiments. At operation 502, the codec determines whether the portion is part of a new sequence of pictures to be processed at the compression device. If the portion is part of a new sequence, flow moves to operation 504 at which the codec identifies the set of pictures to which the portion belongs and determines characteristics of each portion from the set of pictures. In the example of FIG. 1, when portion PA2 is scheduled to be processed at the compression pipeline 100, at the preparation operation 110, the characteristics of each portion of the set 150A are determined. If the portion is not part of a new sequence (i.e., that either the portion was previously scheduled to be compressed and it is being recompressed, or alternatively that the portion was part of a set of portions associated with a previous portion for which characteristics have been previously determined) flow moves to operation 506 at which the codec obtains characteristics of the portion from previously determined characteristics. Thus for a current portion of a set of portions, which is to be compressed in the compression pipeline 100, the codec determines at least one of a type of the portion (I, B, or P), the field type (interlaced or progressive), a plane and the position of the portion with respect to the picture. In some embodiments, the codec determines the type of the portion and the position of the portion. The codec may further keep track of the number of portions within the set of portions with identical characteristics. For example, when portions A and B are of type P each, and when PA2 is processed at the preparation operation 110, the codec determines that there are two portions PA2 and PB2, with identical type and position; two portions PA3 and PB3 with identical type and position; two portions PA4 and PB4 with identical type and position; and finally a single portion PA1 with associated characteristics and a single portion PA5 with different characteristics. Alternatively, in the set 150B, when PA3 is processed at the preparation operation 110, the codec determines that there are two portions PA3 and PB3 with identical type and position; two portions PA4 and PB4 with identical type and position; two portions PA5 and PB5 with identical type and position; and finally a single portion PA1 with different characteristics.

Referring back to FIG. 4, flow moves from operation 402 to operation 404 at which the codec determines whether the portion is of type B. When the portion is of type B, the flow moves to operation 406 at which the codec determines a quantization parameter (QP) for the portion. The codec computes a slope of QPs between two extremities of two successive SubGOPs in display order (an I or P picture of each one the subGOPs) and interpolates the QP of the B slice type portion based on its position on this slope. The QP for the current portion is then determined based on a current QP and the interpolated QP. For example, the QP of the current portion=current QP+interpolated QP offset+slice type and hierarchy level QP Offset. A SubGOP (sub-group of pictures) is a subset of pictures that are grouped according to hierarchical dependencies between the pictures. A subGOP may be a single picture, a series of B type pictures with some of the pictures they refer to. In some embodiments, the operations 404 and 406 are optional and can be skipped.

When the portion is not of type B, the flow moves to operation 408 at which the codec determines an allocated number of bits for the portion based on the weight of the portion relative to weights of other portions of the set of portions. The allocated number of bits represents a number of bits to be distributed to the current portion such that a value of a bit bucket tends towards 0 bits. The allocated number of bits for the current portion (e.g., PA2 at T1) is determined based on the weight of the current portion relative to the weight of the total set of portions and the target bit rate. In some embodiments, the bit bucket provides an indication of the number of bits used by previously compressed portions of the stream when compared with the target bit rate for that stream. If the value of the bit bucket is positive, it is an indication that there are extra bits that can be spent for compressing the remaining portions of the stream of pictures (these bits can be used to improve the quality of the compression of the remaining portions of the stream); if the value of the bit bucket is negative, it is an indication that there is a bit debt and less bits than the target bit rate should be used for the remaining portions of the stream to refund the bit debt; if the value of the bit bucket is 0, it indicates that the compression of the previous portions of the stream was performed according to the target bit rate. In some embodiments, at the time of determining the allocated number of bits for the current portion, the codec may not have access to all compression statistics related to all portions preceding the current portion in the compression order, as some of these portions may still be in the compression pipeline. Therefore in these embodiments, the value of the bit bucket used to allocate the number of bits may be a predicted value determined based on predicted compression statistics (e.g., predicted size of the portions) estimated for the portions that are still being processed in the compression pipeline. In some embodiments, the codec may keep track of a predicted value of the bit bucket (which may be computed with effective sizes of portions that completed their compressions, and an estimated size for portions still being processed) and an effective value of the bit bucket (which is based only on effective sizes of encoded portions).

Figure 6:
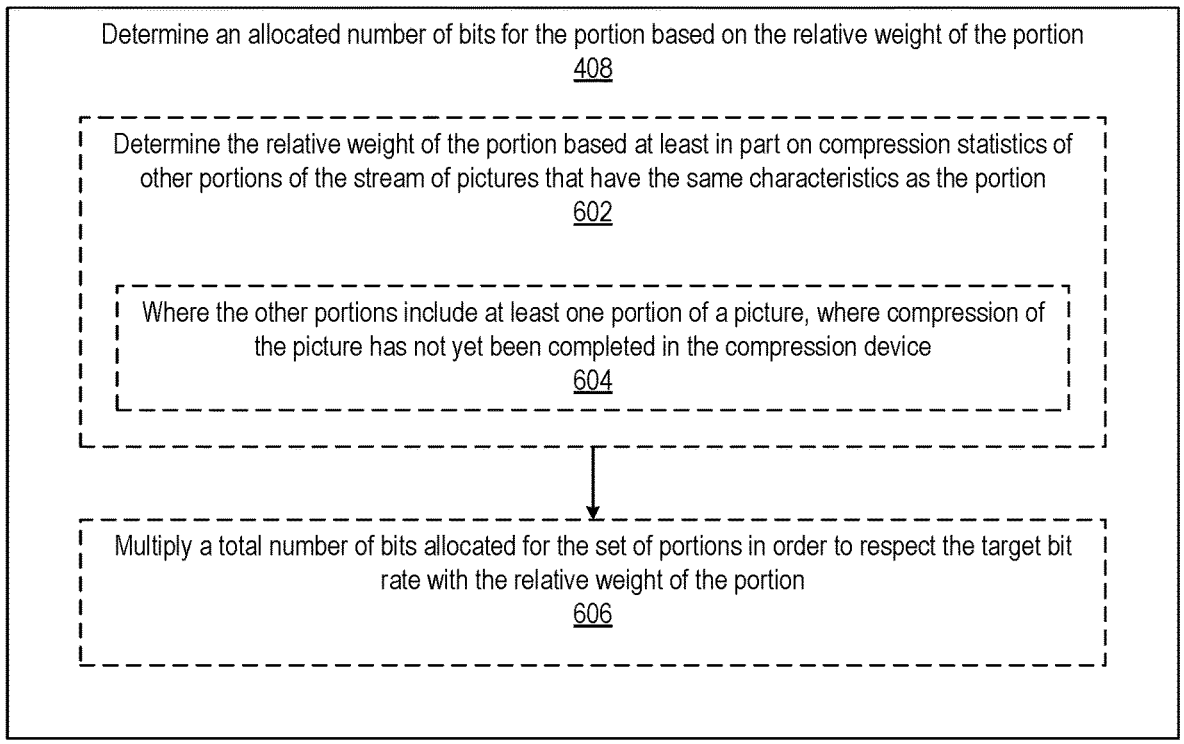
FIG. 6 illustrates a flow diagram of exemplary detailed operations for determining an allocated number of bits for the portion based on the relative weight of the portion with respect to other portions in accordance with some embodiments.

FIG. 6 illustrates a flow diagram of exemplary detailed operations for determining an allocated number of bits for the portion based on the relative weight of the portion with respect to other portions in accordance with some embodiments. At operation 602, the codec determines the relative weight of the current portion based at least in part on compression statistics of other portions of the stream of pictures that have the same characteristics. In some embodiments, portions of pictures may have the same characteristics if they are at the same position and have a same type. In other embodiments, portions of pictures may have the same characteristics if they have in addition to a same position and same type, at least one of a same field type and/or plane. In some other embodiments, portions of pictures may have the same characteristics if they have at least one of a same position, same type, a same field type and plane.

In some embodiments the relative weight of a portion (e.g., portion_relative_weight) is computed according to the following equation (1):

$$portion\_relative\_weight = portion\_weight / total\_weight$$

Where portion_weight represents the weight of the current portion, which is to be compressed in the compression pipeline; and the total_weight represents the total weight of all portions of the set of portions to which the current portion belongs.

For example, PA2_relative_weight=weight of PA2/total weight of the portions of the set 150A.

Alternatively, the PA3_relative_weight=weight of PA3/ total weight of portions of 150B. Thus the relative weight of a portion is dependent on the total weight of the set of portions to which the portion belongs, where the set of portions is dynamic and changes from portion to portion. This provides the embodiments of the present invention with the ability to quickly adapt at the portion level to changes in the stream and provide updated configuration parameters for processing a portion at the moment of processing of the portion, where the updated configuration parameters are determined with respect to other portions of the stream that have not yet been processed.

A weight of the current portion (portion_weight) is determined as a function of the performance or the efficiency factor of previously encoded portions of pictures which have the same characteristics as the current portion (e.g., previously encoded portions of the same type and at the same position). In one embodiment, the efficiency factor of a portion is computed once the compression of the portion has been completed in the codec and compression statistics resulting from this compression output at the post encoding operation 143. In some embodiments, the compression statistics include a corresponding number of bits of the encoded portion output at the post encoding operation 143. In other embodiments, the compression statistics include an estimation of the number of bits of the encoded portion output at the transformation analysis operation 137. Other efficiency factor measures may be applicable. In a non-limiting example, the weight of a portion is computed according to the following equation:

portion_weight=portion_Efficiency*portion_
QstepFactorFromQPOffsetInverse* portionRelativeSizeToPicture. (2)

Where portionRelativeSizeToPicture represents the relative size of the portion with respect to the picture to which it belongs. In a non-limiting example, the relative size represents the ratio of the number of macroblocks of the portion with respect to the number of macroblocks of the picture.

portion_QstepFactorFromQPOffsetInverse is a value which introduces the QP offset into the weight equation (2). It affects the weight by reducing the number of bits allocated.

Referring back to equation (1), the relative weight of the current portion is determined based on the current weight of the portion as well as the total weight of the set of portions. In some embodiments, the total weight of the portions is computed as the sum of the weights of each portion of the set of portions, where the weight of each portion is defined in equation (2). The weight of each one of these portions depends on the efficiency factor of the portion which is determined based on the compression statistics of previously encoded portions with the same characteristics as the portion.

The efficiency factor is an indication of a number of bits (i.e., a size of the encoded portion) that it takes to compress a portion with a given quantization parameter. In some embodiments, a portion that takes more bits to compress at a given QP has a higher efficiency factor value than a portion that takes less bits at the same QP. In some embodiments, at operation 604, the efficiency factor of the portion (and consequently the relative weight of the portion) is determined based on partial compression statistics associated with a picture that is currently being processed within the compression device. In some embodiments, the partial compression statistics result from the partial processing of a picture in the pipeline. For example, the partial compression statistics result from the processing of other portions of the same picture and/or portions of pictures which precede the first picture in the compression pipeline 100 while the compression of this picture is not yet complete. In some embodiments, the efficiency factor may also be determined based on compression statistics related to the processing of portions of other pictures which have completed their processing in addition to the partial compression statistics. The partial compression statistics may include information related to the processing of a portion when the portion has completed its processing (e.g., effective size of the encoded portion), or intermediary information related to the processing of the portion at other operations of the pipeline.

Flow then moves from operation 604 to operation 606, at which the codec multiplies a total number of bits allocated for the set of portions (e.g., the set 150A) in order to achieve the target bit rate with the relative weight of the portion.

$$AllocatedBitsofportion = \frac{\text{portion\_weight}}{\text{total\_weight}} * SetSizeInBits \quad (3)$$

Where SetSizeInBits represents the number of bits allocated to the set of portions in order to achieve the target bit rate. In some embodiments, the size of the set in bits can be determined by multiplying the number of pictures present in the set of portions of pictures by the target number of bits allowed for each picture in order to achieve the target bit rate.

Referring back to FIG. 4, flow moves from operation 408 to operation 410 at which the codec determines a predicted number of bits for the portion based on a current quantization parameter. The predicted number of bits is an indication of a size of the current portion when compressed according to the current quantization parameter. The current quantization parameter (current QP) is a default quantization parameter associated to the processing of the current portion prior to performing the operations of the rate control for determining updated configuration parameters. In some embodiments, the current quantization parameter may be an initial value based on the compression parameters for processing the stream of pictures. Alternatively, the current quantization parameter may be an updated value used to compress previously encoded portions of the stream of pictures. Flow then moves to operation 412, at which the quantization parameter for configuring the compression device to process the current portion is determined. This quantization parameter is determined based at least in part on the allocated number of bits for the portion and the predicted number of bits for the portion. In some embodiments, an iterative scheme is used to determine the quantization parameter for processing the current portion, such that it minimizes the difference between the predicted number of bits used to compress the portion and the number of bits that were allocated for this portion. In one example, the iterative scheme minimizes the value of the bit bucket. In order to minimize the value of the bit bucket, the quantization parameter is adjusted. In some embodiments, the codec not only verifies that the value of the bit bucket is minimized but may also use other criteria such as the difference between the latest QP (i.e., current QP) and the new QP determined for the current portion is lower than a given value before selecting the new quantization parameter. Other selection criteria may apply, for example a determination that a Coded Picture Buffer overflow or underflow occurred.

While in some embodiments, the allocated number of bits and the predicted number of bits of the current portion are used to determine a quantization parameter for the current portion (e.g., PA2 of the set of portions 150A, or for PA3 of the set of portions 150B), in other embodiments, they are used to determine other and/or additional configuration parameters. In an exemplary embodiments, the configuration parameters include a set of coefficients representative of the quantization parameter for compression of the current portion. For example, the set of coefficients may be a plurality of quantization parameter offsets and biases which may vary according to the type and size of a portion. In one example, the configuration parameters may further include an interoffset bias (which is used in the determination of the prediction mode at the prediction operation 115). In another example, the configuration parameter may include a decision to dynamically modify the structure of the GOP (GroupOfPicture) to be processed. The configuration parameters may further include an indication to skip compression of a portion (by generating a PSKIP for the portion). The configuration parameters listed herein are exemplary only and other configuration parameters may be determined.

In some embodiments, the predicted number of bits used to determine the configuration parameters according to the relative weight of a portion may be smaller than the effective number of bits for that portion when encoded. This causes an overflow of the effective bit budget when the current portion is compressed according to these configuration parameters (which is reflected in the value of the bit bucket being negative). However, in some compression modes the overflow may not be acceptable (e.g., according to the XAVC Intra, when operating in a constant bit rate mode, overflows and underflows are not authorized by this standard).

Figure 7A:
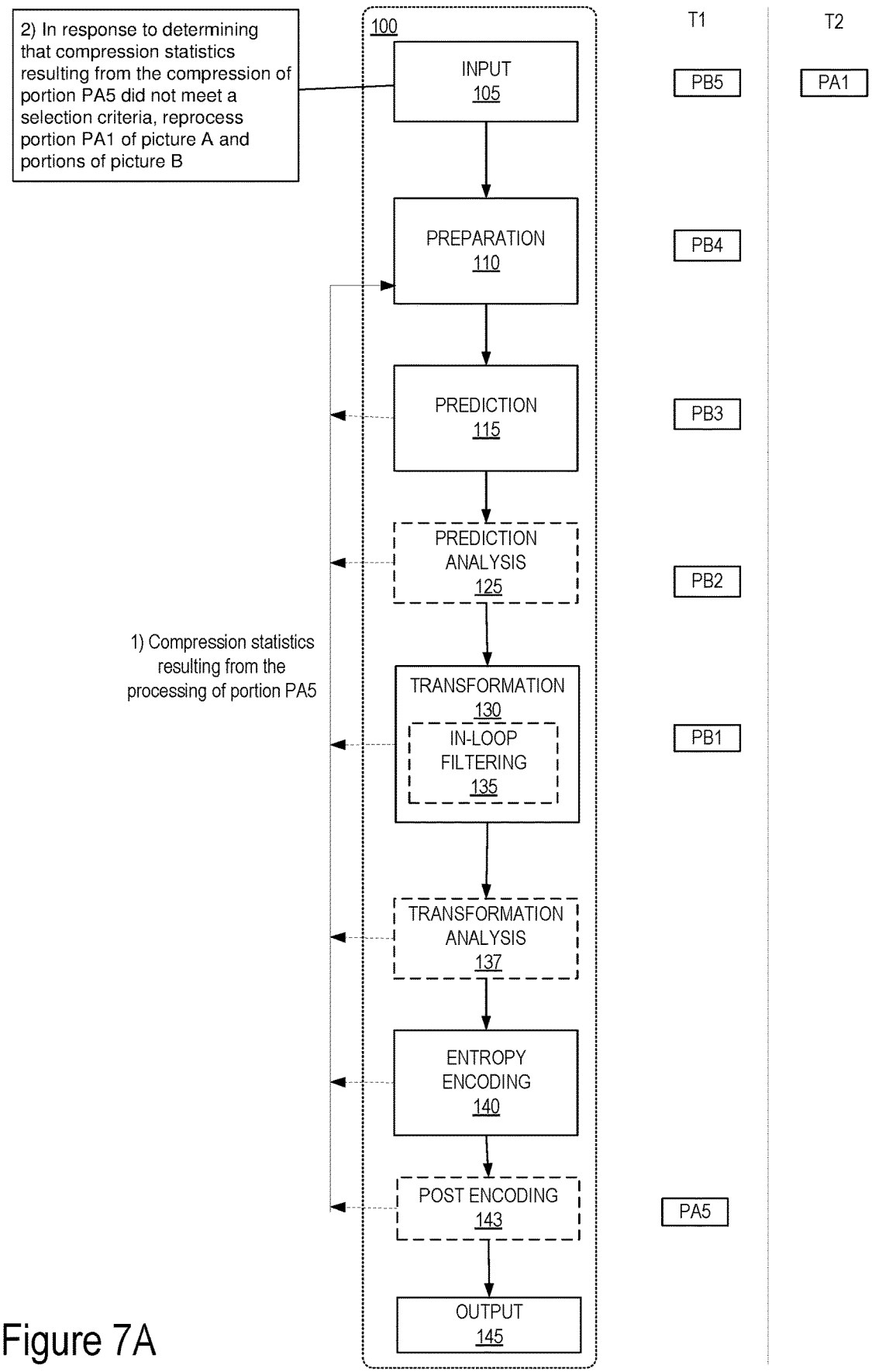
FIGS. 7A illustrates a block diagram of an exemplary compression pipeline in accordance with some embodiments.
Figure 7B:
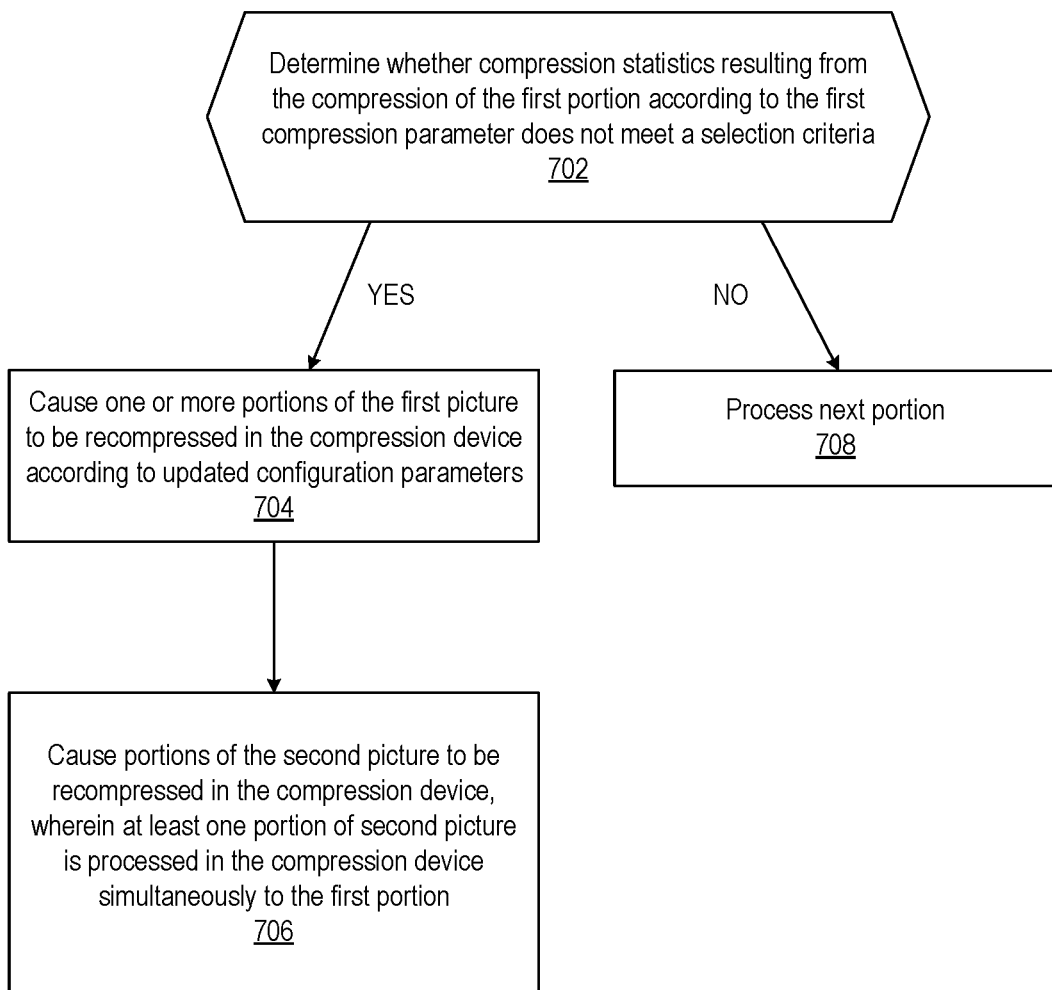
FIG. 7B illustrates a flow diagram of operations for causing recompression of one or more portions of picture when a selection criteria of the encoded portion is not met in accordance with some embodiments.

FIG. 7A illustrates a block diagram of an exemplary compression pipeline in accordance with some embodiments. FIG. 7B illustrates a flow diagram of operations for causing recompression of one or more portions of picture when a selection criteria of the encoded portion is not met in accordance with some embodiments. The block diagram of FIG. 7A will be described with reference to the operations of FIG. 7B.

At time T1, multiple portions of picture B are processed at different stages of the pipeline. Portion PB5 is at the input operation, portion PB4 is at the preparation operation 110, portion PB3 is at the prediction operation 115, portion PB2 is at the prediction analysis operation 125 and portion PB1 is at the transformation operation 130. Simultaneously portion PA5 of picture A is processed at the post encoding operation 143. In some embodiments, upon receiving compression statistics resulting from the compression of the portion PA5, the codec may determine (operation 702) whether these compression statistics satisfy a selection criteria for the associated portion and/or for the picture including the portion. In some embodiments, the compression statistics include a corresponding number of bits of the encoded portion output at the post encoding operation 143 and/or an estimation of the number of bits of the encoded portion output at the transformation analysis operation 137. In some embodiments, the selection criteria is met when the compression statistics indicate that the compression of the portion satisfy a maximum size limit for the encoded portion (and/or picture), a minimum size limit of the encoded portion (and/or picture), a quality target for the encoded portion (and/or picture) or any other selection criteria associated with the processing of the portion according to the determined configuration parameter. While in some embodiments, the selection criteria apply to the encoded portion when considered separately from other portions of the picture to which it belongs, in other embodiments, the selection criteria apply to the picture to which the portion belongs taken as a whole.

When the codec determines that the selection criteria is met, the flow moves to operation 708 at which the codec processes the next portion according to the compression order. Alternatively, when the codec determines that the selection criteria is not met, the flow moves to operation 704 at which one or more portions of this picture are to be recompressed according to updated configuration parameters. For example, upon determining that encoded portion PA5 did not meet the selection criteria, the codec may determine to reprocess the portion PA5 or the entire picture A. For example, it may restart processing at time T2, portion PA1 of picture A. In some embodiments, the flow moves to operation 706, at which the codec determines to reprocess the portions of picture B which are being processed in the compression pipeline simultaneously to the portion PA5. While the illustrated example discloses that the decision to reprocess a portion or a picture is made when a last portion of the picture (PA5 of picture A) is completed, the embodiments are not so limited. The codec may determine following the processing of each portion of a picture (regardless of its position within the picture, or its position in the compression order), whether the portion meets the selection criteria. According to this determination, the codec may recompress one or more portions of one or more pictures being processed in the compression pipeline.

Thus when the codec determines that the selection criteria is not met, the codec can reprocess the current portion and/or additional portions of pictures. These additional portions may include the other portions of the same picture. In other embodiments the additional portions may include portions of one or more other pictures different from the picture of the current portion. For example, the codec may reprocess all portions which were being processed in the compression pipeline when the codec was evaluating the selection criteria for the current portion. The operations described with reference to FIGS. 7A-7B enable the codec to react to any overflows of the effective bit budget when the configuration parameter of a portion resulted in causing the overflow.

While the embodiments of FIG. 1 and FIG. 7A describe an exemplary compression pipeline 100 in which each operation of the pipeline processes a single portion of a picture at a given time; in other embodiments, each operation may be operative to independently process more than one portion in parallel. As will be described in further details below with reference to the codec 800 of FIG. 8, each stage of the pipeline 100 can be implemented through one or more independent components such that at a moment T, one or more portions of a picture can be processed in that same stage.

In an alternative embodiment, when the codec determines that the selection criteria is not met, it may issue a PSKIP for the current portion that cause the selection criteria not to be met. For example, this may be performed when the compression of the stream of pictures is performed under low latency mode. In some embodiments, the codec may determine to encode the current portion and all following portions up to a total size of a picture from the stream according to PSKIP. Alternatively, when the codec determines that the selection criteria is not met, it can continue processing the picture while warning the application that the selection criteria were not met and/or apply a variable frame rate.

Architecture

Figure 8:
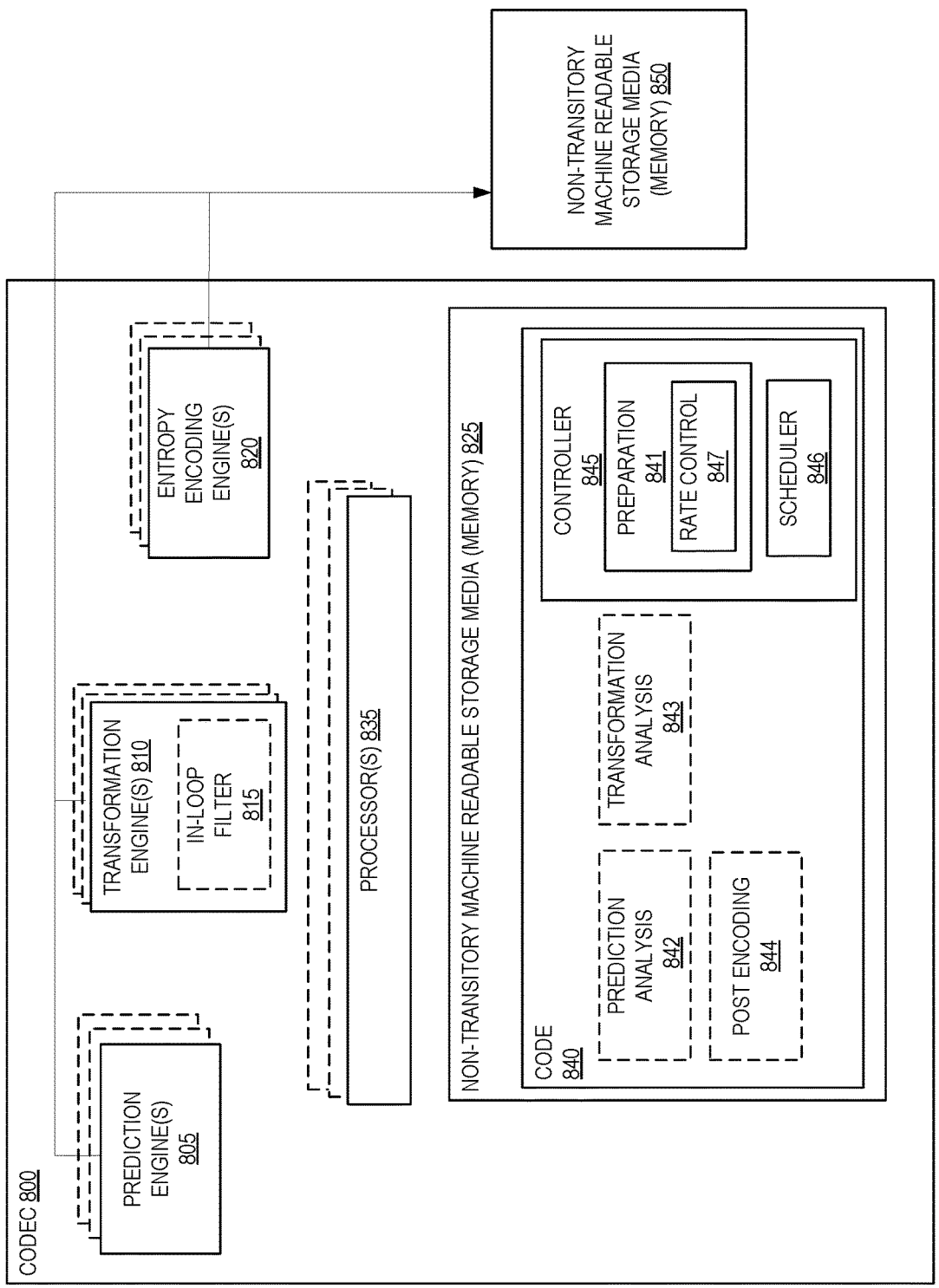
FIG. 8 is a block diagram of an exemplary codec for implementing a compression pipeline enabling parallel compression of streams of pictures in accordance with some embodiments of the invention.

The pipeline 100 may have several implementations. In particular the pipeline 100 can be implemented as 1) a special-purpose compression/decompression device that uses custom application—specific integrated—circuits (ASICs) and a special-purpose operating system (OS); and 2) a general purpose compression/decompression device that uses common off-the-shelf (COTS) processors and a standard OS. FIG. 8 is a block diagram of an exemplary codec 800 for implementing a compression pipeline enabling compression of streams of pictures in accordance with some embodiments. The codec 800 provides an exemplary special purpose compression/decompression device for implementing the compression pipeline 100 according to some embodiments. In alternative embodiments other pipelines (with a different task combination and division) can be used to enable compression of image data and therefore other codec architectures can be used for implementing the pipeline without departing from the scope of the present invention. In some embodiments, the codec is operative to process streams of pictures, where portions of pictures are processed in a sequential order. In other embodiments, the codec is operative to process streams of pictures, where portions of pictures are process in parallel. In some embodiments, the codec may be configurable and operative to perform compression in parallel or in sequence according to configuration parameter.

The illustrated exemplary codec 800 discloses multiple dedicated hardware components (e.g., a multiple prediction engine(s) 805, multiple transformation engines (810), and multiple entropy encoding engines 820) implementing a compression pipeline 100 in which a plurality of portions of pictures (from the same or different pictures) can be processed in parallel. For example, the codec may include a plurality of engines of each type. In these embodiments, each engine is replicated such that the codec may implement a plurality of pipelines 100. Further the codec may include multiple processors for implementing duplicated instances of the software components of the pipeline (e.g., the input operation 105, the preparation operation 110, the prediction analysis 125, the transformation analysis, the post encoding 143, and the output operation 145). Each component may include a number N of duplicated instances (hardware or software instances) which is different from a number M of duplicated instances of another component.

The codec includes code/instructions stored on a machine readable storage media 825 which when executed on one or more processors (e.g., processors 835) is operative to configure and control the different components of the codec for compressing and/or decompressing image data. In some embodiments, the code includes controller 845 (including the preparation code 841, a rate control 847, and the scheduler 846 for scheduling the processing of portions within the pipeline), the prediction analysis 842, the transformation analysis 843, and the post encoding 844 components which are operative to perform the following operations of the compression pipeline 100: input 105, preparation 110, prediction analysis 125, the transformation analysis 137, the post encoding operation 143, and output 145. Thus in some embodiments, these operations are implemented as code/instructions stored on a machine readable storage media which when executed on a processor (835) enabled the codec to perform operations described with references to FIGS. 1-7. In some embodiments, the operations described with reference to FIGS. 1-7 are performed by the rate control 847 including code/instructions which when executed by one or more processors enable the codec to compress a stream of pictures according to a target bit rate. In some embodiments, the operations of FIGS. 1-7 are performed when the codec operates in a "controlled bit rate" mode. In some embodiments, machine readable storage media 825 can be memory 850.

The codec includes one or more prediction engines 805, one or more transformation engines 810, one or more entropy encoding engines 820, and one or more processors 835, each coupled with a non-transitory machine readable storage media 850, which is referred to herein as memory 850. In some embodiments, the memory 850 is external to the codec (e.g., memory 850 can be memory 910 of processing system 900) and it is coupled to the various components (e.g., prediction engines 805, transformation engines 810, entropy encoding engines 820, and/or processors 835) through a memory interface (not show). In some of these embodiments, the memory interface is internal to the codec 800 while the memory 850 is external to the codec 800. In an alternative embodiment, both the memory interface and the memory 850 are external to the codec 800. In some embodiments, prediction engines 805, transformation engines 810 and entropy encoding engines 820 are operative to read and write data to memory 850 without passing through the processors 835. Alternatively, in other embodiments, the prediction engines 805, transformation engines 810 and entropy encoding engines 820 read and write data to memory 850 by passing through the processors 835, such that read and write operations are executed through the processor and transmitted to the appropriate component. In these embodiments, the different engines would not be coupled with the memory. In some embodiments, transformation engines 810 and entropy encoding engines 820 may be connected together in order to pass information directly there between. In some embodiments, each one of the transformation engines 810 may also include an in-loop filter 815.

In general, image data is stored in the memory 850 and requests are sent to the codec 800 to compress the image data. Following the receipt of the compression requests, the controller 845 configures prediction engine 805 with appropriate parameters for processing a portion of a picture from the image data stored in memory 850. In some embodiments, the prediction engine 805 is configured with configuration parameters determined at the preparation operation of the pipeline 100 according to partial compression statistics. In some of these embodiments the configuration parameters are determined in order to achieve a substantially constant bit rate compression of a stream of pictures including the portion of the picture. The prediction engine 805 accesses the memory 850, processes the portion of the picture, and stores the result in the memory 850. In some embodiments, the prediction engine 805 is a hardware component operative to implement the operations of operation 115 of pipeline 100. Following its processing at one of the prediction engines 805, the portion of a picture is analyzed to gather a set of compression statistics related to the processing of a portion of a picture in the prediction engine. The set of compression statistics is then used by the controller 845 at the preparation operation 110 to determine configuration parameters for a new portion of picture. The compression statistics can be stored in memory 850 to be read by the controller 845 or transmitted directly to controller 845.

The transformation engine 810 is configured with appropriate parameters and retrieves the portion of the picture from the memory 850 in order to process it. In some embodiments, the transformation engine 810 is configured with configuration parameters determined at the preparation operation 110 of the pipeline 100 according to partial compression statistics. In some embodiments, the transformation engine 810 is a hardware component operative to implement the operations of operation 130 of pipeline 100. Further the transformation engine 810 is operative to gather a set of compression statistics related to the processing of a portion of a picture in the transformation engine. The set of compression statistics is then used by the controller 845 at the preparation operation 110 to determine configuration parameters for a new portion of picture. The compression statistics can be stored in memory 850 to be read by the controller 845 or transmitted directly to controller 845.

In some embodiments the portion of the picture processed by the transformation engine 810 is immediately transferred to the in-loop filter 815 for processing without going through the memory 850. In other embodiments the transformation engine 810 processes the portion of the picture and stores the result of the processing to memory 850 before the in-loop filter 815 accesses it. According to this embodiment, the in-loop filter 815 reads the portion of the picture from the memory 850, processes it, and stores the result in memory. In a subsequent operation data is read from memory 850 and processed by the entropy encoding engine 820. In another embodiment, the entropy encoding engine 820 receives data to process directly from the transformation engine 810. In some embodiments, the entropy encoding engine 820 is configured with configuration parameters determined at the preparation operation 110 of the pipeline 100 according to partial compression statistics. In some embodiments, the entropy encoding engine 820 is a hardware component operative to implement the operations of operation 140 of pipeline 100. Further the entropy encoding engine 820 is operative to gather a set of compression statistics related to the processing of a portion of a picture in the entropy encoding engine. The set of compression statistics is then used by the controller 845 at the preparation operation 110 to determine configuration parameters for a new portion of picture. The compression statistics can be stored in memory 850 to be read by the controller 845 or transmitted directly to controller 845.

Once the data is processed in the entropy encoding engine 820, the result of the processing is stored to memory 850 or alternatively output to an external component. The controller 845 is operative to perform the output operation 145 of pipeline 100 either by storing the compressed portion of picture in memory or outputting it to an external component.

While the codec 800 illustrates a set of components performing operations for compressing an image data, other embodiments of the codec can be used. For example, some components can be combined in a single component without departing from the scope of the present invention (e.g., each one of the transformation engines 810 can be combined with a respective one of the entropy encoding engines 820, alternatively, each one of the transformation engines 810 can be combined with a respective one of the prediction engines 805, other combination can be performed).

Figure 9:
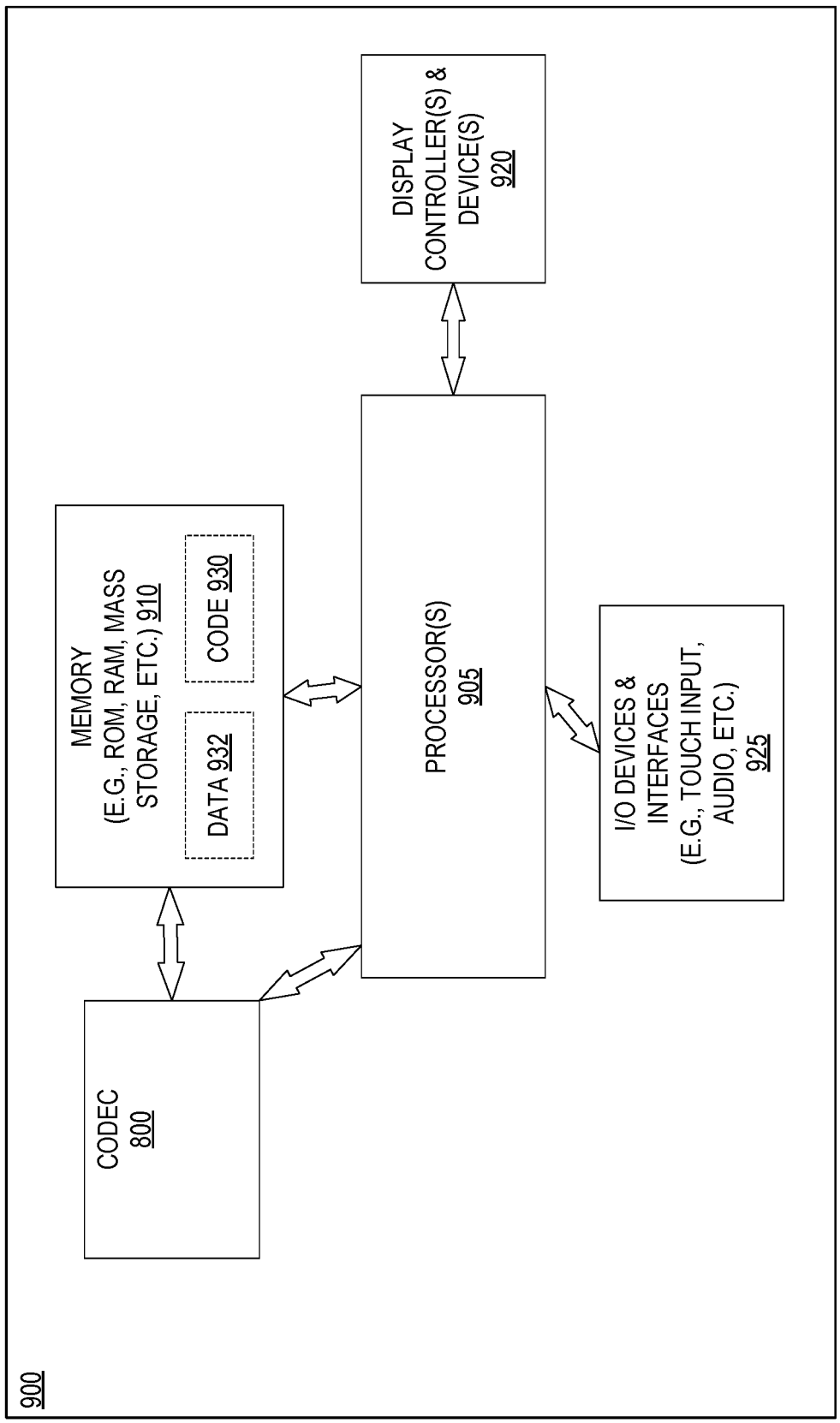
FIG. 9 illustrates a block diagram of an exemplary data processing system including a codec in accordance with some embodiments of the invention.

FIG. 9 illustrates an exemplary data processing system including a codec in accordance with some embodiments. The data processing system 900 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory, dynamic random-access memory (DRAM)) and machine-readable transmission media (also called a carrier) (e.g., electrical, optical, radio, acoustical or other form of propagated signals—such as carrier waves, infrared signals), which is coupled to the processor(s) 905. For example, the depicted machine readable storage media 910 may store code 930 that, when executed by the processor(s) 905, causes the data processing system 900 to request compression of image data (e.g., stored as part of data 932) from the codec 800. Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 900 may further include a display controller and display device 920 which provide a visual user interface for the user, e.g., GUI elements or windows. The data processing system 900 also includes one or more input or output ("I/O") devices and interfaces 925, which allow a user to provide input to, receive output from, and otherwise transfer data to and from the system. These I/O devices 925 may include a microphone, a speaker, a mouse, keypad, keyboard, a touch panel or a multi-touch input panel, camera, frame grabber, optical scanner, network interface, modem, other known I/O devices or a combination of such I/O devices. The I/O devices and interfaces 925 may also include a connector for a dock or a connector for a USB interface, FireWire, Thunderbolt, Ethernet, etc., to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc. It will be appreciated that one or more buses may be used to interconnect the various components shown in FIG. 9.

It will be appreciated that additional components, not shown, may also be part of the system 900, and, in certain embodiments, fewer components than that shown in FIG. 9 may also be used in a data processing system 900. For example, in some embodiments the data processing system 900 may include or be coupled with an image acquisition device.

The components of the system 900 may be packaged in various manners. For example, the one or more of the processor(s) 905 and the codec 800 may be included in a System-on-a-chip (SoC). The codec 800 may be included in a chip while the central processor(s) 405 is provided externally to the chip. The memory 910 and the codec 800 may be provided in a SoC or a chip. The codec 800 may be included in an integrated circuit or a chip and the memory 910 may be external to the integrated circuit. The codec 800, the processor(s) 905 may be coupled to the memory through a memory controller (not illustrated). The codec 800 may also be located remotely from the processor(s) 905 with the two components being part of a network.

In one embodiment, a control signal may be received by the codec 800 in order to trigger compression of image data. The control signal may be generated by an application running on a processor coupled with the codec 800 (e.g., one or more processor(s) 905 of a data processing system 900). The image data to be compressed may be stored in memory 910, to an external memory coupled with the system 900 or any other memory operatively connected to codec 800, directly or indirectly. If the image data is stored externally to the system 900, it may be copied into memory 910 before processing, by the codec 800 or by a dedicated component, such as a copy engine (not shown). The application may request that an entire stream of pictures, a portion of a stream of pictures, a picture, or a portion of a picture be compressed. In some embodiments the request for compression may be broken down into a plurality of requests for compressing portions of the stream. The control signal may comprise control information to allow the codec to configure the various components of the codec 800 with appropriate compression parameters in order to perform the requested task(s) of compressing the image data. Configuration may be performed in one or more operations, depending on the initial request and on the format of the request. Compression parameters are initialized from configuration parameters sent by the application. The configuration parameters may be provided to the codec 800 with the request for compression or separately from the request. The codec may further determine configuration parameters for processing a portion of a picture as described with reference to FIGS. 1-7 where the configuration parameters are determined according to a weight of the picture relative to a set of portions, where the set of portions is defined dynamically.

Some embodiments have been described with reference to two different pictures processed in parallel in a compression pipeline (e.g., pictures A and B), while partial statistics resulting from the partial compression of a first picture are used to determine configuration parameters for a second picture when compression of the first picture is not yet complete. However the invention is not so limited and the embodiments described herein apply to portions of a same picture being processed in parallel in the compression pipeline. For example, when a new portion of a picture is being processed at the preparation operation 110, one or more other portions may be processed at other stages of the pipelines, and some portions of the same picture may have completed being compressed in the pipeline. The codec is operative to use partial compression statistics resulting from the processing of these other portions of the same picture (which have completed compression or not yet) to determining configuration parameters at the preparation operation 110 for the new portion of that same picture.

While embodiments are described with respect to portions from pictures A and B, being processed within the compression pipeline 100, the embodiments of the invention apply to portions of pictures of varying sizes such that portions of two or more pictures may be processed simultaneously within the same compression pipeline regardless of the number of portions or size of these portions included within each picture. For example, a picture with a different number of portions, a different size than the pictures A or B can be processed in the compression pipeline 100. Further in some embodiments, two pictures of different sizes (and/or different number of portions) can be processed in parallel in the compression pipeline 100 without departing from the scope of the current invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a compression device of enabling compression of a stream of pictures according to a target bit rate, the stream of pictures including a plurality of pictures each having multiple portions, respectively, the method comprising:
    when a portion of picture from the stream of pictures is scheduled to be processed in the compression device, performing the following:
        a) allocating a number of bits for a set of N portions of pictures from the stream of pictures in order to achieve the target bit rate, wherein the set of N portions of pictures is dynamically defined for the portion concurrent with the scheduling of the processing of the portion, the set of N portions of pictures including the portion and N-1 portions which succeed the portion in a compression order and which have not yet been processed;
        b) allocating a number of bits for the portion based at least in part on a ratio of a weight of the portion and a total weight of the set of N portions and based on the allocated number of bits for the set of N portions, wherein the total weight of the set of N portions is a sum of a plurality of weights that includes the weight of the portion, wherein each of the plurality of weights is associated with a respective portion of the set of N portions, and wherein each of the set of N portions has associated characteristics and wherein the weight associated with each of the set of N portions is based on compression statistics of one or more portions processed in the compression device before the portion and having same characteristics as the respective portion of the set of N portions, and determining a configuration parameter for the portion based on the allocated number of bits for the portion;
    compressing the portion based on the configuration parameter;
        performing the acts a) and b) for a first portion concurrent with an act of scheduling a processing in the compression device of the first portion, the acts a) and b) performed for the first portion with the compression statistics updated to reflect results of a processing of a first plurality of portions processed in the compression device before the first portion;
        subsequent to the performance of the acts of a) and b) for the first portion, performing the acts a) and b) for a second portion concurrent with an act of scheduling a processing in the compression device of the second portion, the second portion succeeding the first portion in the compression order, the acts a) and b) performed for the second portion with the compression statistics updated to reflect results of a processing of a second plurality of portions processed in the compression device before the second portion, the second plurality of portions including the first plurality of portions and any portions processed in the compression device subsequent to the performance of the acts of a) and b) for the first portion; and subsequent to the performance of the acts of a) and b) for the second portion, performing the acts a) and b) for a third portion concurrent with an act of scheduling a processing in the compression device of the third portion, the third portion succeeding the second portion in the compression order, the acts a) and b) performed for the third portion with the compression statistics updated to reflect the results of a processing of a third plurality of portions processed in the compression device before the third portion, the third plurality of portions including the second plurality of portions and any portions processed in the compression device subsequent to the performance of the acts of a) and b) for the second portion, wherein, for the first portion, the set of N portions includes portions from each of a first picture and a second picture included in the plurality of pictures, the first portion and the second portion included in the first picture, the third portion included in the second picture.

2. The method of claim 1, wherein the determining the configuration parameter includes:

estimating a size of the portion of picture based on a default quantization parameter to obtain a predicted number of bits for the portion of picture; and wherein the determining the configuration parameter for the portion of picture is further based on the predicted number of bits for the portion of picture.

3. The method of claim 2, wherein the determining the configuration parameter includes:

determining a quantization parameter that minimizes a difference between the predicted number of bits for the portion of picture and the allocated number of bits for the portion of picture.

4. The method of claim 3, wherein the determining the configuration parameter includes:

determining a quantization parameter that minimizes a bit bucket that provides an indication of the number of bits used by previously compressed portions of the stream of pictures when compared with the target bit rate for the stream of pictures.

5. The method of claim 1, wherein the characteristics include at least one of a type of the respective portion of picture and a position of the respective portion of picture within a picture.

6. A compression device for enabling compression of a stream of pictures according to a target bit rate, the stream of pictures including a plurality of pictures each having multiple portions, respectively, the compression device comprising:

a non-transitory computer readable storage medium to store instructions; and one or more processors coupled with the non-transitory computer readable storage medium to process the stored instructions to perform operations including:

when a portion of picture from the stream of pictures is scheduled to be processed in the compression device, performing the following:

a) allocating a number of bits for a set of N portions of pictures from the stream of pictures in order to achieve the target bit rate, wherein the set of N portions of pictures is dynamically defined for the portion concurrent with the scheduling of the processing of the portion, the set of N portions of pictures including the portion and N-1 portions which succeed the portion in a compression order and which have not yet been processed;

b) allocating a number of bits for the portion based at least in part on a ratio of a weight of the portion and a total weight of the set of N portions and based on the allocated number of bits for the set of N portions, wherein the total weight of the set of N portions is a sum of a plurality of weights that includes the weight of the portion, wherein each of the plurality of weights is associated with a respective portion of the set of N portions, and wherein each of the set of N portions has associated characteristics and wherein the weight associated with each of the set of N portions is based on compression statistics of one or more portions processed in the compression device before the portion and having same characteristics as the respective portion of the set of N portions, and determining a configuration parameter for the portion based on the allocated number of bits for the portion;

compressing the portion based on the configuration parameter;

performing the acts a) and b) for a first portion concurrent with an act of scheduling a processing in the compression device of the first portion, the acts a) and b) performed for the first portion with the compression statistics updated to reflect results of a processing of a first plurality of portions processed in the compression device before the first portion;

subsequent to the performance of the acts of a) and b) for the first portion, performing the acts a) and b) for a second portion concurrent with an act of scheduling a processing in the compression device of the second portion, the second portion succeeding the first portion in the compression order, the acts a) and b) performed for the second portion with the compression statistics updated to reflect results of a processing of a second plurality of portions processed in the compression device before the second portion, the second plurality of portions including the first plurality of portions and any portions processed in the compression device subsequent to the performance of the acts of a) and b) for the first portion; and subsequent to the performance of the acts of a) and b) for the second portion, performing the acts a) and b) for a third portion concurrent with an act of scheduling a processing in the compression device of the third portion, the third portion succeeding the second portion in the compression order, the acts a) and b) performed for the third portion with the compression statistics updated to reflect the results of a processing of a third plurality of portions processed in the compression device before the third portion, the third plurality of portions including the second plurality of portions and any portions processed in the compression device subsequent to the performance of the acts of a) and b) for the second portion,
wherein, for the first portion, the set of N portions includes portions from each of a first picture and a second picture included in the plurality of pictures, the first portion and the second portion included in the first picture, the third portion included in the second picture.

7. The compression device of claim 6, wherein the determining the configuration parameter includes:
estimating a size of the portion of picture based on a default quantization parameter to obtain a predicted number of bits for the portion of picture; and
wherein the determining the configuration parameter for the portion of picture is further based on the predicted number of bits for the portion of picture.

8. The compression device of claim 7, wherein the determining the configuration parameter includes:
determining a quantization parameter that minimizes a difference between the predicted number of bits for the portion of picture of picture and the allocated number of bits for the portion of picture.

9. The compression device of claim 8, wherein the determining the configuration parameter includes:
determining a quantization parameter that minimizes a bit bucket that provides an indication of the number of bits used by previously compressed portions of the stream of pictures when compared with the target bit rate for the stream of pictures.

10. The compression device of claim 6, wherein the characteristics include at least one of a type of the respective portion of picture and a position of the respective portion of picture within a picture.

11. A non-transitory computer readable storage medium that includes code which when executed by one or more processors of a compression device, for enabling compression of a stream of pictures according to a target bit rate, the stream of pictures including a plurality of pictures each having multiple portions, respectively, the code when executed by the one or more processors causing the compression device to perform operations comprising:
when a portion of picture from the stream of pictures is scheduled to be processed in the compression device, performing the following:
a) allocating a number of bits for a set of N portions of pictures from the stream of pictures in order to achieve the target bit rate, wherein the set of N portions of pictures is dynamically defined for the portion concurrent with the scheduling of the processing of the portion, the set of N portions of pictures including the portion and N-1 portions which succeed the portion in a compression order and which have not yet been processed;
b) allocating a number of bits for the portion based at least in part on a ratio of a weight of the portion and a total weight of the set of N portions and based on the allocated number of bits for the set of N portions, wherein the total weight of the set of N portions is a sum of a plurality of weights that includes the weight of the portion, wherein each of the plurality of weights is associated with a respective portion of the set of N portions, and wherein each of the set of N portions has associated characteristics and wherein the weight associated with each of the set of N portions is based on compression statistics of one or more portions processed in the compression device before the portion and having same characteristics as the respective portion of the set of N portions, and
determining a configuration parameter for the portion based on the allocated number of bits for the portion;
compressing the portion based on the configuration parameter;
performing the acts a) and b) for a first portion concurrent with an act of scheduling a processing in the compression device of the first portion, the acts a) and b) performed for the first portion with the compression statistics updated to reflect results of a processing of a first plurality of portions processed in the compression device before the first portion;
subsequent to the performance of the acts of a) and b) for the first portion, performing the acts a) and b) for a second portion concurrent with an act of scheduling a processing in the compression device of the second portion, the second portion succeeding the first portion in the compression order, the acts a) and b) performed for the second portion with the compression statistics updated to reflect results of a processing of a second plurality of portions processed in the compression device before the second portion, the second plurality of portions including the first plurality of portions and any portions processed in the compression device subsequent to the performance of the acts of a) and b) for the first portion; and
subsequent to the performance of the acts of a) and b) for the second portion, performing the acts a) and b) for a third portion concurrent with an act of scheduling a processing in the compression device of the third portion, the third portion succeeding the second portion in the compression order, the acts a) and b) performed for the third portion with the compression statistics updated to reflect the results of a processing of a third plurality of portions processed in the compression device before the third portion, the third plurality of portions including the second plurality of portions and any portions processed in the compression device subsequent to the performance of the acts of a) and b) for the second portion,
wherein, for the first portion, the set of N portions includes portions from each of a first picture and a second picture included in the plurality of pictures, the first portion and the second portion included in the first picture, the third portion included in the second picture.

12. The non-transitory computer readable storage medium of claim 11, wherein the determining the configuration parameter includes:
estimating a size of the portion of picture based on a default quantization parameter to obtain a predicted number of bits for the portion of picture; and
wherein the determining the configuration parameter for the portion is further based on the predicted number of bits for the portion of picture.

13. The non-transitory computer readable storage medium of claim 12, wherein the determining the configuration parameter includes:
determining a quantization parameter that minimizes a difference between the predicted number of bits for the portion of picture and the allocated number of bits for the portion of picture.

14. The non-transitory computer readable storage medium of claim 13, wherein the determining the configuration parameter includes:
   determining a quantization parameter that minimizes a bit bucket that provides an indication of the number of bits used by previously compressed portions of the stream of pictures when compared with the target bit rate for the stream of pictures.

15. The non-transitory computer readable storage medium of claim 11, wherein the characteristics include at least one of a type of the respective portion of picture and a position of the respective portion of picture within a picture.

* * * * *

UNITED STATES PATENT AND TRADEMARK OFFICE
CERTIFICATE OF CORRECTION

| | |
|---|---|
| PATENT NO. | : 11,805,261 B1 |
| APPLICATION NO. | : 17/025695 |
| DATED | : October 31, 2023 |
| INVENTOR(S) | : Mathieu Girard et al. |

It is certified that error appears in the above-identified patent and that said Letters Patent is hereby corrected as shown below:

In the Claims

Claim 8, Column 25, Line 22 replace "of picture of picture" with --of picture--.

Signed and Sealed this
Twenty-third Day of January, 2024

*Katherine Kelly Vidal*

Katherine Kelly Vidal
*Director of the United States Patent and Trademark Office*